US012694351B2

(12) United States Patent　　　(10) Patent No.:　US 12,694,351 B2
Fujimoto　　　　　　　　　　　　　　(45) Date of Patent:　Jul. 28, 2026

(54) WORK INSTRUCTION SYSTEM AND WORK INSTRUCTION METHOD

(71) Applicant: OMRON Corporation, Kyoto (JP)

(72) Inventor: Shinya Fujimoto, Kyoto (JP)

(73) Assignee: OMRON Corporation, Kyoto (JP)

( * ) Notice: Subject to any disclaimer, the term of this patent is extended or adjusted under 35 U.S.C. 154(b) by 42 days.

(21) Appl. No.: 17/770,291

(22) PCT Filed: Oct. 20, 2020

(86) PCT No.: PCT/JP2020/039332
§ 371 (c)(1),
(2) Date: Apr. 20, 2022

(87) PCT Pub. No.: WO2021/100388
PCT Pub. Date: May 27, 2021

(65) Prior Publication Data
US 2022/0391810 A1　　　Dec. 8, 2022

(30) Foreign Application Priority Data

Nov. 22, 2019　　(JP) ................................. 2019-211642

(51) Int. Cl.
*G06Q 10/06*　　　　(2023.01)
*G06Q 10/0631*　　　(2023.01)
*G06Q 10/0639*　　　(2023.01)
(52) U.S. Cl.
CPC . *G06Q 10/06316* (2013.01); *G06Q 10/06398* (2013.01)
(58) Field of Classification Search
None
See application file for complete search history.

(56) References Cited

U.S. PATENT DOCUMENTS 6,499,001 B1 * 12/2002 Meyer .............. G05B 19/41865
　　　　　　　　　　　　　　　　　　　　　　　　　700/121
10,366,521 B1 * 7/2019 Peacock ............... G02B 27/017
　　　　　　　(Continued)

FOREIGN PATENT DOCUMENTS

JP　　　2004029932　　　1/2004
JP　　　2006010489　　　1/2006
　　　　　　(Continued)

OTHER PUBLICATIONS

Funk, M., Mayer, S. and Schmidt, A., Oct. 2015. Using in-situ projection to support cognitively impaired workers at the workplace. In Proceedings of the 17th international ACM SIGACCESS conference on Computers & accessibility (pp. 185-192) ( Year: 2015).*

(Continued)

*Primary Examiner* — Patricia H Munson
*Assistant Examiner* — Marjorie Pujols-Cruz
(74) *Attorney, Agent, or Firm* — JCIPRNET

(57) ABSTRACT

A work instruction system includes: an imaging device that captures a captured image including an operator that performs a plurality of element tasks with respect to a target; an information processing device that includes a completion determination part that determines, for each element task, the completion of the element task, and a work identifier that identifies the element task to be performed next by the operator; and a display device that displays the element task to be performed next by the operator.

6 Claims, 4 Drawing Sheets

(56) References Cited

U.S. PATENT DOCUMENTS

| | | | | |
|---|---|---|---|---|
| 11,494,988 | B2 * | 11/2022 | Ben-Dor | G02B 27/017 |
| 2016/0358324 | A1 | 12/2016 | Sugimoto et al. | |
| 2021/0373664 | A1 * | 12/2021 | Duarte De Oliveira | ................... |
| | | | | G06F 3/015 |
| 2022/0215327 | A1 * | 7/2022 | Kitazumi | G06V 40/165 |

FOREIGN PATENT DOCUMENTS

| | | | |
|---|---|---|---|
| JP | 2006099558 | | 4/2006 |
| JP | 2014096068 | | 5/2014 |
| JP | 2015114676 | | 6/2015 |
| JP | 6198990 | | 9/2017 |
| JP | 2019086827 | | 6/2019 |
| JP | 2021076990 | A * | 5/2021 |

OTHER PUBLICATIONS

Bhattacharya, B. and Winer, E., 2015, March. A method for real-time generation of augmented reality work instructions via expert movements. In the Engineering Reality of Virtual Reality 2015 (vol. 9392, pp. 109-121). SPIE. (Year: 2015).*

Büttner, S., Sand, O. and Röcker, C., 2017. Exploring design opportunities for intelligent worker assistance: a new approach using projetion-based AR and a novel hand-tracking algorithm. In Ambient Intelligence: 13th European Conference, AML 2017, Malaga, Spain, Apr. 26-28, 2017 (Year: 2017).*

Funk, M., Mayer, S. and Schmidt, A., 2015, October. Using in-situ projection to support cognitively impaired workers at the work-place. In Proceedings of the 17th international ACM SIGACCESS conference on Computers & accessibility (pp. 185-192) (Year: 2015).*

Müller, B.C., Nguyen, T.D., Dang, Q.V., Duc, B.M., Seliger, G., Kruger, J. and Kohl, H., 2016. Motion tracking applied in assembly for worker training in different locations. Procedia CIRP, 48, pp. 460-465. (Year: 2016).*

"International Search Report (Form PCT/ISA/210) of PCT/JP2020/039332," mailed on Jan. 12, 2021, with English translation thereof, pp. 1-4.

"Written Opinion of the International Searching Authority (Form PCT/ISA/237)" of PCT/JP2020/039332, mailed on Jan. 12, 2021, with English translation thereof, pp. 1-7.

"Office Action of Japan Counterpart Application", issued on Sep. 12, 2023, with English translation thereof, p. 1-p. 7.

"Office Action of China Counterpart Application", issued on Jan. 31, 2024, with English translation thereof, p. 1-p. 19.

* cited by examiner

WORK INSTRUCTION SYSTEM AND WORK INSTRUCTION METHOD

CROSS-REFERENCE TO RELATED APPLICATION

This application is a 371 application of the International PCT application serial no. PCT/JP2020/039332, filed on Oct. 20, 2020, which claims the priority benefit of Japan Patent Application No. 2019-211642, filed on Nov. 22, 2019. The entirety of each of the above-mentioned patent applications is hereby incorporated by reference herein and made a part of this specification.

TECHNICAL FIELD

The present invention relates to a work instruction system and a work instruction method.

RELATED ART

There is known a work instruction system that instructs an operator of a factory or the like about work content. For example, Patent Document 1 discloses a work instruction system including a projection device that projects a work content instruction image onto a mounting means.

PRIOR-ART DOCUMENTS

Patent Documents

Patent Document 1: Japanese Patent No. 6198990

SUMMARY OF THE INVENTION

Problems to Be Solved by the Invention

However, in the conventional art as described above, since multiple element tasks (for example, an element task of inserting a cable and an element task of tightening a screw) are displayed at the same time, it is difficult for the operator to grasp the order of performing each element task. Consequently, there is a problem that the operator's working speed is lowered until the operator becomes proficient in each element task. In the case where an inexperienced operator performs each element task in an order different from a desired order, there is a risk that the quality of a finished product may be defective.

One aspect of the present invention aims to realize a work instruction system by which multiple element tasks can be appropriately and quickly performed even by an inexperienced operator.

Means for Solving the Problems

In order to solve the above problems, a work instruction system according to one aspect of the present invention includes: an imaging device, capturing a captured image including an operator that performs multiple element tasks with respect to a target; an information processing device, including a completion determination part and a work identifier, the completion determination part determining completion of the element task for each of the multiple element tasks based on the captured image, the work identifier identifying among the multiple element tasks the element task to be performed next by the operator based on the determination made by the completion determination part; and a display device, displaying the element task to be performed next by the operator.

In order to solve the above problems, a work instruction method according to one aspect of the present invention includes: an imaging step in which a captured image including an operator that performs multiple element tasks with respect to a target is captured; a completion determination step in which completion of the element task is determined for each of the multiple element tasks based on the captured image; a work identification step in which the element task to be performed next by the operator is identified among the multiple element tasks based on the determination made in the completion determination step; and a display step in which the element task to be performed next by the operator is displayed.

Effects of the Invention

According to one aspect of the present invention, a work instruction system can be provided by which multiple element tasks can be appropriately and quickly performed even by an inexperienced operator.

DESCRIPTION OF THE EMBODIMENTS

An embodiment (hereinafter also written as "the present embodiment") according to one aspect of the present invention is hereinafter described based on the drawings.

Embodiment 1

§ 1 Application Example

<Work Instruction System>

Figure 1:
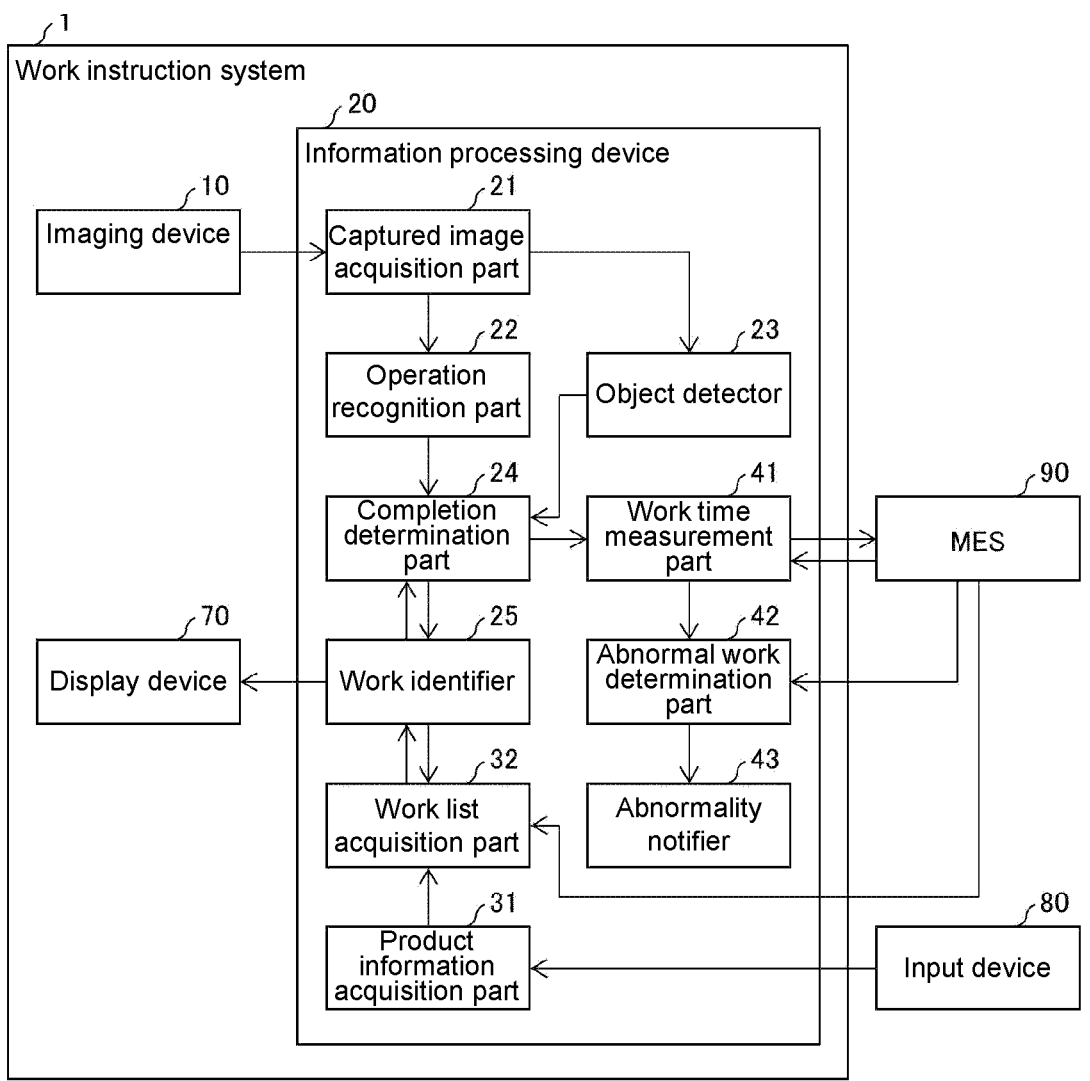
FIG. 1 is a block diagram showing an example of a configuration of a work instruction system according to Embodiment 1 of the present invention.

FIG. 1 is a block diagram showing an example of a configuration of a work instruction system 1 according to Embodiment 1 of the present invention. The work instruction system 1 instructs an operator that performs multiple element tasks with respect to a target about work content.

Figure 2:
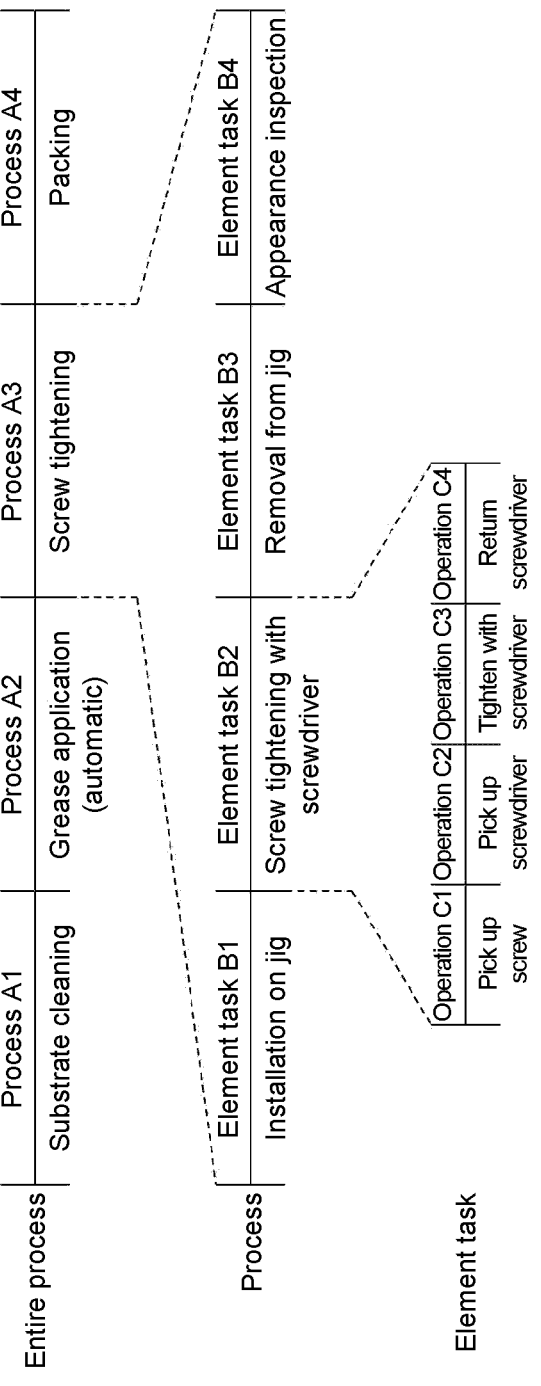
FIG. 2 schematically illustrates an example of a relationship between process and element task in the work instruction system according to FIG. 1.

FIG. 2 schematically illustrates an example of a relationship between process and element task in the work instruction system 1 according to FIG. 1. As shown in FIG. 2, an entire manufacturing process relating to the target includes processes A1 to A4. Each process includes multiple element tasks. For example, a screw tightening process of the process A3 includes, more specifically, element tasks B1 to B4. In the element task B2, the operator tightens a screw with a screwdriver.

<Field of View as Seen Through Display Device>

Figure 4:
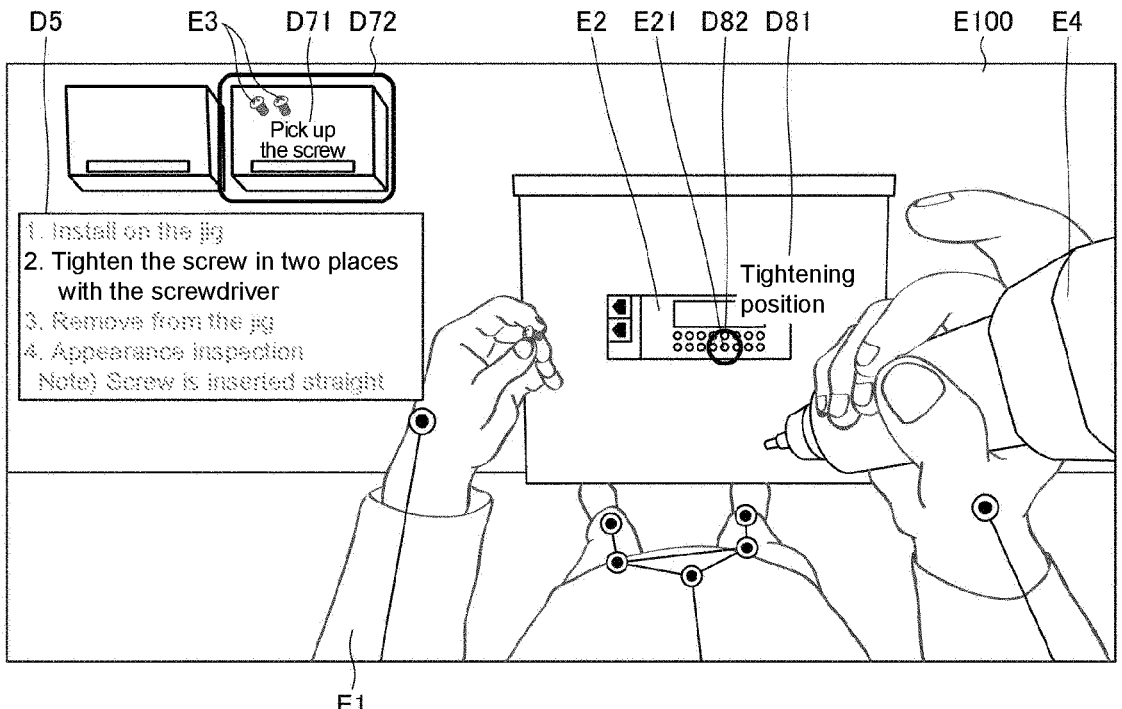
FIG. 4 illustrates an example of a field of view as seen by an operator through a display device in the work instruction system according to FIG. 1 in the case where a glasses-style HMD is used as the display device.

FIG. 4 illustrates an example of a field of view E100 as seen by the operator through a display device 70 in the work instruction system 1 according to FIG. 1 in the case where a glasses-style head mounted display (hereinafter also HMD) is used as the display device 70. In the field of view E100, a display image of the display device 70 overlaps a field of view as seen in the case where the operator does not wear the display device 70.

In the example of FIG. 4, the display device 70 displays the element task B2 (shown in FIG. 2) to be performed next by an operator E1. In the element task B2, the operator E1 tightens a screw (attachment member) E3 into a screw hole E21 of a target E2 with a screwdriver (tool) E4. With respect to the element task B2, the display device 70 displays a process description D5, a screw description D71, a screw position D72, a screw tightening description D81 and a screw tightening position D82.

According to the above configuration, since an information processing device 20 determines completion of an element task for each element task, and the display device 70 displays an element task to be performed next, multiple element tasks can be appropriately and quickly performed even by an inexperienced operator.

§ 2 Configuration Example

<Work Instruction System>

FIG. 1 is a block diagram showing an example of a configuration of the work instruction system 1 according to Embodiment 1 of the present invention. The work instruction system 1 instructs an operator that performs multiple element tasks with respect to a target about work content.

FIG. 2 schematically illustrates an example of a relationship between process and element task in the work instruction system 1 according to FIG. 1. As shown in FIG. 2, the entire manufacturing process relating to the target includes the processes A1 to A4. The process A1 is a substrate cleaning process. The process A2 is a grease application process. The process A3 is a screw tightening process. The process A4 is a packing process.

Each process includes multiple element tasks. For example, the screw tightening process of the process A3 includes, more specifically, the element tasks B1 to B4. In the element task B1, the operator installs the target on a jig. In the element task B2, the operator tightens a screw with a screwdriver. In the element task B3, the operator removes the target from the jig. In the element task B4, the operator performs an appearance inspection of the target.

Each element task includes multiple operations performed by the operator. For example, the element task B2 includes, more specifically, operations C1 to C4. In the operation C1, the operator picks up the screw. In the operation C2, the operator picks up the screwdriver. In the operation C3, the operator turns the screwdriver and tightens the screw. In the operation C4, the operator returns the screwdriver to a predetermined position.

As used herein, an element task can be defined as a collection of a series of operations having the same purpose. For example, in the example of FIG. 2, the operations C1 to C4 are performed by the operator for the purpose of "tightening a screw with a screwdriver". Accordingly, the operations C1 to C4 constitute one element task B2. In contrast, the element tasks B1 and B3 have different purposes of "installing a target on a jig" and "removing a target from a jig", respectively, and are thus different element tasks from the element task B2.

Alternatively, an element task may be defined as a collection of a series of operations using the same tool with respect to a target. For example, in the example of FIG. 2, the tool used with respect to the target in the operations C1 to C4 is the screwdriver. Accordingly, the operations C1 to C4 constitute one element task B2. In contrast, in the element tasks B1 and B3, the tool used with respect to the target is the jig. Thus, the element tasks B1 and B3 are different element tasks from the element task B2. Since the element tasks B1 and B3 are not a continuous series of operations, they are each an independent element task.

Alternatively, an element task may be defined as a collection of a series of operations in which the same member is attached to or removed from a target. For example, in the example of FIG. 2, in the operations C1 to C4, the "screw" is attached to the target. Accordingly, the operations C1 to C4 constitute one element task B2. In contrast, in the element task B1, the "jig" is attached to the target; in the element task B3, the "jig" is removed from the target. Accordingly, the element tasks B1 and B3 are different element tasks from the element task B2.

As shown in FIG. 1, the work instruction system 1 is connected to an external input device 80 and an external manufacturing execution system (hereinafter also MES) 90, and includes an imaging device 10, the information processing device 20, and the display device 70.

The imaging device 10 captures a captured image including the operator. The captured image captured by the imaging device 10 may be a still image or a moving image.

The information processing device 20 includes a product information acquisition part 31, a work list acquisition part 32, a captured image acquisition part 21, an operation recognition part 22, an object detector 23, a completion determination part 24, a work identifier 25, a work time measurement part 41, an abnormal work determination part 42, and an abnormality notifier 43.

The product information acquisition part 31 acquires product information of the target from the external input device 80. The input device 80 may be, for example, a barcode reader that reads a barcode of a work instruction sheet. Alternatively, the product information acquisition part 31 may acquire the product information of the target from the external MES 90.

Based on the product information acquired by the product information acquisition part 31, the work list acquisition part 32 acquires, from the MES 90, a process list of processes to be performed with respect to the target and a work list of element tasks included in each process. The process list includes, for example, the processes A1, A2, A3 and A4 shown in FIG. 2. The work list includes a list of element tasks of each process. For example, the work list for the process A3 includes the element tasks B1, B2, B3 and B4.

The captured image acquisition part 21 acquires the captured image captured by the imaging device 10. The operation recognition part 22 recognizes an operation of the operator in the captured image acquired by the captured image acquisition part 21. For example, the operation recognition part 22 may recognize the operation of the operator based on a position of the operator's hand. The object detector 23 detects a position of the target in the captured image acquired by the captured image acquisition part 21.

Based on the operation of the operator recognized by the operation recognition part 22 and the position of the target detected by the object detector 23, the completion determination part 24 determines completion of an element task for each element task. In other words, the completion determination part 24 determines completion of the element task for each element task based on the captured image captured by the imaging device 10. For each element task, the completion determination part 24 stores in advance a condition for determining that the element task has been completed.

The completion determination part 24 may determine completion of the element task based on the position of the operator's hand and the position of the target in the captured image. In this case, even if the motion of the operator's hand differs from person to person, completion of the element task can be appropriately determined. Even if the operator interrupts the element task, the completion determination part 24 is able to appropriately determine whether the element task has been completed based on the position of the target. When determining that an element task to be performed by the operator has been completed, the completion determination part 24 notifies the work identifier 25 that the element task has been completed.

Based on the process list and the work list acquired by the work list acquisition part 32 as well as the determination made by the completion determination part 24, the work identifier 25 identifies among multiple element tasks the element task to be performed next by the operator. The work identifier 25 notifies the completion determination part 24 of the element task to be performed next by the operator.

Based on the determination made by the completion determination part 24, the work time measurement part 41 measures work time taken by the operator to perform each element task. The work time measurement part 41 may record the measured work time in, for example, the MES 90. The MES 90 may calculate a standard work time for each element task by accumulating data of the work time recorded by the work time measurement part 41 and calculating an average value.

The abnormal work determination part 42 compares the work time measured by the work time measurement part 41 with, for example, the standard work time calculated by the MES 90, and determines whether an element task performed by the operator is abnormal. For example, if the work time measured by the work time measurement part 41 is significantly longer than the standard work time calculated by the MES 90, it may be determined that the element task performed by the operator is abnormal.

The abnormality notifier 43 issues a notification of abnormality based on the determination made by the abnormal work determination part 42. The abnormality notifier 43 may notify, for example, the display device 70 or an administrator's computer, that the element task performed by the operator is abnormal.

Among each part of the information processing device 20, for example, the captured image acquisition part 21, the operation recognition part 22, the object detector 23 and the completion detection part 24 may include a personal computer (hereinafter also PC). The work identifier 25, the product information acquisition part 31, the work list acquisition part 32, the work time measurement part 41, the abnormal work determination part 42 and the abnormality notifier 43 may include a programmable logic controller (hereinafter also PLC). Alternatively, the operation recognition part 22 and the object detector 23 may be provided in the imaging device 10.

The display device 70 displays the element task identified by the work identifier 25 as to be performed next (from now) by the operator. The display device 70 displays multiple element tasks at the same time and highlights the element task to be performed next by the operator. As the display device 70, various general displays can be used. As the display device 70, for example, a head mounted display (HMD) worn by the operator may be used, and in particular, a glasses-style HMD may be used.

<Work Instruction Method>

Figure 3:
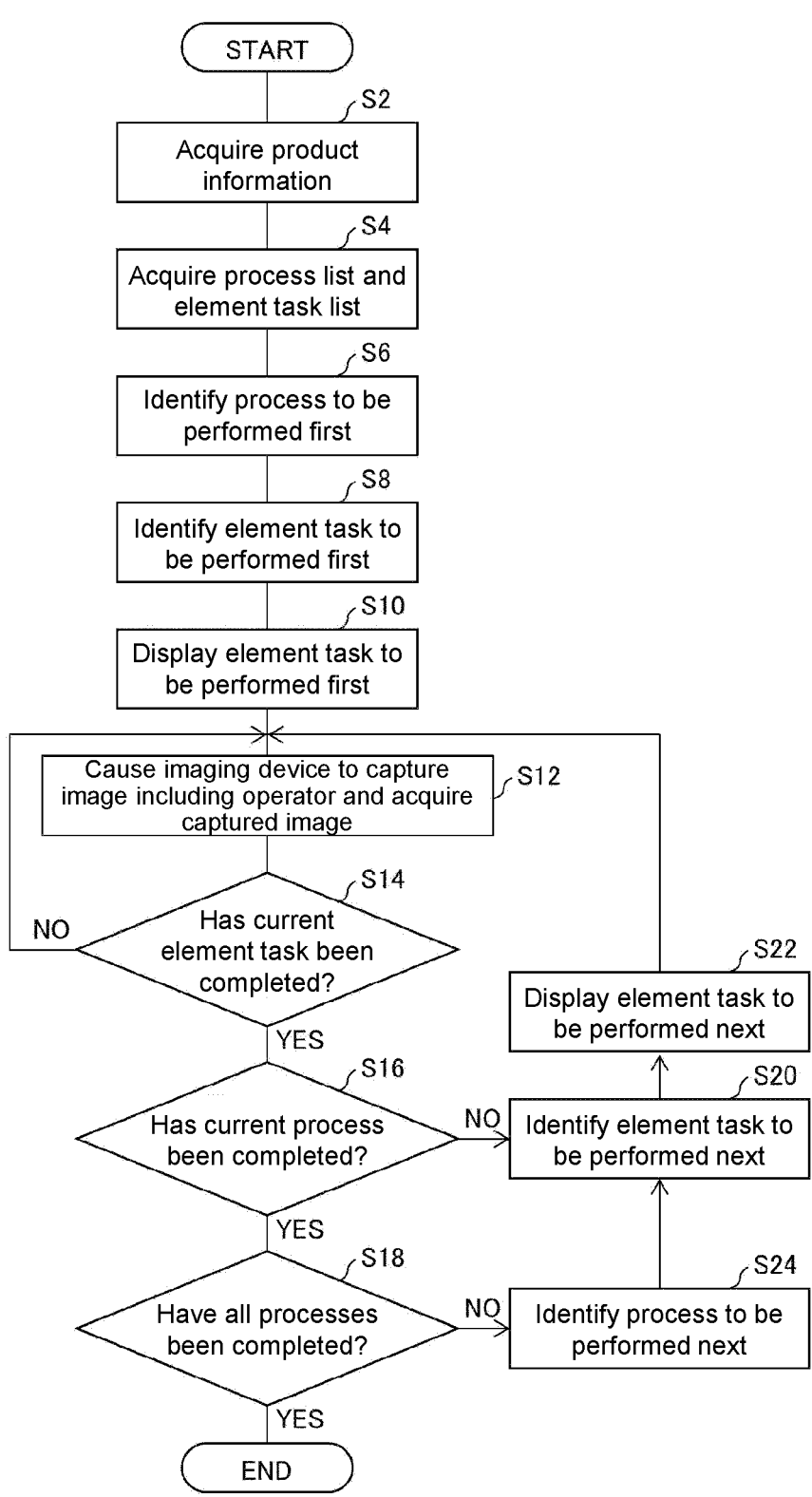
FIG. 3 is a flowchart showing a work instruction method of the work instruction system according to FIG. 1.

FIG. 3 is a flowchart showing a work instruction method of the work instruction system 1 according to FIG. 1. A processing procedure described below is only an example, and each processing may be changed wherever possible. With respect to the processing procedure described below, steps can be omitted, replaced, and added as appropriate depending on embodiments. A series of processings shown in FIG. 3 is started in association with, for example, the operator's input of information about the target to the input device 80 (shown in FIG. 1).

The operator assembles multiple types (multiple products) of targets. The assembly method differs depending on the type of the target conveyed to a work position. Hence, for example, the operator in charge of the process A3 inputs the product information of the target to the input device 80 when the target is conveyed to the work position.

In step S2, the product information acquisition part 31 acquires the product information of the target from the input device 80. In step S4, based on the product information acquired in S2, the work list acquisition part 32 acquires, from the MES 90, a process list and a work list corresponding to the target.

In step S6, based on the process list acquired in S4, the work identifier 25 identifies a process to be performed first by the operator. In step S8, based on the process list and the work list acquired in S4, the work identifier 25 identifies an element task to be performed first by the operator.

In step S10, the work identifier 25 causes the display device 70 to display the element task identified in S8 as to be performed first. In step S12 (imaging step), the captured image acquisition part 21 causes the imaging device 10 to capture a captured image including the operator, and acquires the captured image captured by the imaging device 10. Then, the operation recognition part 22 recognizes an operation of the operator in the captured image acquired by the captured image acquisition part 21. The object detector 23 detects a position of the target in the captured image acquired by the captured image acquisition part 21.

In step S14 (completion determination step), based on the operation of the operator recognized by the operation recognition part 22 and the position of the target detected by the object detector 23, the completion determination part 24 determines whether a current element task has been completed. In other words, the completion determination part 24 determines completion of the element task for each element task based on the captured image captured by the imaging device 10.

As an example, the element task B2 (shown in FIG. 2) of tightening a screw with a screwdriver is discussed. The completion determination part 24 determines that the element task B2 has been completed when the operator's operation (for example, the position of the hand) and the position of the target satisfy a predetermined condition. For example, the completion determination part 24 determines whether the multiple operations C1 to C4 included in the element task B2 have been performed (completed). When the multiple operations C1 to C4 have been performed, it is determined that the element task B2 has been completed.

For example, the completion determination part 24 determines that the operation C1 of "picking up a screw" has been completed when the position of the operator's hand is within a predetermined range from a position of a screw stocker. After the operation C1, the completion determination part 24 determines that the operation C2 of "picking up a screwdriver" has been completed when the position of the operator's hand is within a predetermined range from a position of the screwdriver. After the operation C2, the completion determination part 24 determines that the operation C3 of "tightening with the screwdriver" has been completed when the position of the operator's hand is within a predetermined range from the position of the target. After the operation C3, the completion determination part 24 determines that the operation C4 of "returning the screwdriver" has been completed when the position of the operator's hand is within a predetermined range from a position of a screwdriver storage area.

For example, in the case where the object detector 23 detects that the screw is inserted in a screw hole of the target after the operation recognition part 22 recognizes that, for example, the position of the operator's hand is in the vicinity of the screw hole, the completion determination part 24 may determine that the current element task B2 has been completed.

If the completion determination part 24 determines that the current element task has not been completed (NO in S14), the process returns to S12. If the completion determination part 24 determines that the current element task has been completed (YES in S14), the process proceeds to step S16, and the work identifier 25 determines whether a current process has been completed. For example, when considering the process A3 (shown in FIG. 2), the work identifier 25 may determine that the current process A3 has been completed in the case where the completion determination part 24 determines that the element tasks B1, B2, B3 and B4 have all been completed.

If the work identifier 25 determines that the current process has not been completed (NO in S16), the process proceeds to step S20 (work identification step), and the work identifier 25 identifies the element task to be performed next by the operator. Then, in step S22 (display step), the work identifier 25 causes the display device 70 to display the element task identified in S20 as to be performed next by the operator. After S22, the process returns to S12.

If the work identifier 25 determines that the current process has been completed (YES in S16), the process proceeds to step S18, and the work identifier 25 determines whether all the processes have been completed based on the process list and the work list acquired by the work list acquisition part 32. For example, when considering the entire process shown in FIG. 2, the work identifier 25 may determine that all the processes have been completed in the case where the processes A1, A2, A3 and A4 have been completed.

If the work identifier 25 determines that not all the processes have been completed (NO in S18), the process proceeds to step S24, and the work identifier 25 identifies a process to be performed next by the operator. After S24, the process proceeds to S20. Then, if the work identifier 25 determines that all the processes have been completed (YES in S18), a work instruction of the work instruction system 1 ends.

<Field of View as Seen Through Display Device>

FIG. 4 illustrates an example of the field of view E100 as seen by the operator through the display device 70 in the work instruction system 1 according to FIG. 1 in the case where a glasses-style HMD is used as the display device 70. In the field of view E100, a display image of the display device 70 overlaps a field of view as seen in the case where the operator does not wear the display device 70.

In the example of FIG. 4, the display device 70 displays the element task B2 (shown in FIG. 2) to be performed next by the operator E1. In the element task B2, the operator E1 tightens the screw (attachment member) E3 into the screw hole E21 of the target E2 with the screwdriver (tool) E4. With respect to the element task B2, the display device 70 displays the process description D5, the screw description D71, the screw position D72, the screw tightening description D81 and the screw tightening position D82.

The process description D5 is a display of descriptions of the elements tasks B1 to B4 (shown in FIG. 2) of the process A3. Among the descriptions of the element tasks B1 to B4, only the description saying "2. tighten the screw in two places with the screwdriver" of the element task B2 to be performed next by the operator E1 is highlighted in dark color, and the descriptions of the other element tasks B1, B3 and B4 are displayed in light color. In other words, the display device 70 displays multiple element tasks B1 to B4 at the same time in the process description D5, and highlights the element mark B2 to be performed next by the operator.

The screw description D71 is a display of a description of the operation C1 (shown in FIG. 2) on the screw E3, and is displayed as "pick up the screw" in the vicinity of the screw E3. The screw position D72 is a display indicating a position of a box storing the screw E3, and is displayed as a substantially rectangular figure surrounding the box storing the screw E3.

The screw tightening description D81 is a display of a description of the operation C3 (shown in FIG. 2) for screw tightening, and is displayed as "tightening position" in the vicinity of the screw hole E21. The screw tightening position D82 is a display indicating a position of the screw hole E21, and is displayed as a circular figure surrounding the screw hole E21.

Effects

According to the above configuration, since the information processing device 20 determines completion of the element task for each element task, and the display device 70 displays the element task to be performed next, multiple element tasks can be appropriately and quickly performed even by an inexperienced operator.

Since the display device 70 displays multiple element tasks at the same time and highlights the element task to be performed next by the operator, the operator is able to easily grasp a flow of the multiple element tasks. Accordingly, the operator is able to relatively appropriately and quickly perform multiple element tasks.

Since the completion determination part 24 determines completion of the element task based on the position of the operator's hand and the position of the target, even if the motion of the operator's hand differs from person to person, completion of the element task can be appropriately determined. Even if the operator interrupts the element task, the completion determination part 24 is able to appropriately determine whether the element task has been completed based on the position of the target.

<Modifications

In the present embodiment, as shown in the process description D5 of FIG. 4, the display device 70 displays multiple element tasks at the same time and highlights the element task to be performed next by the operator. However, the present invention is not limited thereto. The display device 70 may display only one of multiple element tasks. In this case, since the display device 70 displays each element task one by one, even if the display device 70 has a limited screen size, the operator is able to easily grasp the element task to be performed next. Accordingly, the operator is able to relatively appropriately and quickly perform multiple element tasks.

In the present embodiment, as shown in FIG. 3, the imaging step S12 is performed after the work identifier 25 has caused the display device 70 to display the element task to be performed first (after S10) and before the completion determination step S14. However, the present invention is not limited thereto. The imaging step S12 may be performed at any timing after the product information acquisition part 31 has acquired the product information of the target (after S2) and before the completion determination step S14.

In the imaging step S12, the imaging may be started as a moving image, for example, after the product information acquisition part 31 has acquired the product information of the target (after S2) and before the work list acquisition part 32 acquires the process list and the work list.

[Implementation Example by Software]

A control block of the information processing device 20 may be implemented by a logic circuit (hardware) formed on an integrated circuit (IC chip) or the like or may be implemented by software.

In the latter case, the information processing device 20 includes a computer executing commands of a program being software that realizes each function. This computer includes, for example, one or more processors, and includes a computer-readable recording medium storing the above program. In the above computer, an object of the present invention is achieved by the processor reading the program from the recording medium and executing the program. As the processor, a central processing unit (CPU), for example, can be used. As the recording medium, a "non-transitory tangible medium," for example, in addition to a read only memory (ROM), a tape, a disk, a card, a semiconductor memory, a programmable logic circuit or the like, can be used. A random access memory (RAM) or the like for developing the above program may further be included. The program may be supplied to the computer via an arbitrary transmission medium (communication network or broadcast wave, etc.) capable of transmitting the program. One aspect of the present invention can also be realized in the form of a data signal embedded in a carrier wave, the data signal being embodied by the above program by electronic transmission.

The present invention is not limited to each embodiment described above, and may be modified in various ways within the scope of the claims. An embodiment derived from a proper combination of technical means disclosed in respective different embodiments is also encompassed in the technical scope of the present invention.

CONCLUSION

A work instruction system according to one aspect of the present invention includes: an imaging device, capturing a captured image including an operator that performs multiple element tasks with respect to a target; an information processing device, including a completion determination part and a work identifier, the completion determination part determining completion of the element task for each of the multiple element tasks based on the captured image, the work identifier identifying among the multiple element tasks the element task to be performed next by the operator based on the determination made by the completion determination part; and a display device, displaying the element task to be performed next by the operator.

According to the above configuration, since the information processing device determines completion of the element task for each element task, and the display device displays the element task to be performed next, multiple element tasks can be appropriately and quickly performed even by an inexperienced operator.

In the work instruction system according to one aspect of the present invention, the display device may display the multiple element tasks at the same time and highlights the element task to be performed next by the operator. According to the above configuration, since the operator is able to easily grasp a flow of multiple element tasks, the operator is able to relatively appropriately and quickly perform multiple element tasks.

In the work instruction system according to one aspect of the present invention, the display device may display only one of the multiple tasks. According to the above configuration, even if the display device has a limited screen size, the operator is able to easily grasp the element task to be performed next. Accordingly, the operator is able to relatively appropriately and quickly perform multiple element tasks.

In the work instruction system according to one aspect of the present invention, the completion determination part may determine completion of the element task based on a position of a hand of the operator and a position of the target in the captured image. According to the above configuration, since the completion determination part determines completion of the element task based on the position of the operator's hand and the position of the target, even if the motion of the operator's hand differs from person to person, completion of the element task can be appropriately determined. Even if the operator interrupts the element task, the completion determination part is able to appropriately determine whether the element task has been completed based on the position of the target.

In the work instruction system according to one aspect of the present invention, the element task may be a collection of a series of operations having the same purpose. Alternatively, in the work instruction system according to one aspect of the present invention, the element task may be a collection of a series of operations using the same tool with respect to the target. Alternatively, in the work instruction system according to one aspect of the present invention, the element task may be a collection of a series of operations in which the same member is attached to or removed from the target.

In order to solve the above problems, a work instruction method according to one aspect of the present invention includes: an imaging step in which a captured image including an operator that performs multiple element tasks with respect to a target is captured; a completion determination step in which completion of the element task is determined for each of the multiple element tasks based on the captured image; a work identification step in which the element task to be performed next by the operator is identified among the multiple element tasks based on the determination made in the completion determination step; and a display step in which the element task to be performed next by the operator is displayed.

The information processing device according to each aspect of the present invention may be realized by a computer. In this case, an information processing device control program that realizes the information processing device on the computer by operating the computer as each part (software element) provided in the information processing device, and a computer-readable recording medium storing the same, also fall within the scope of the present invention.

What is claimed is:

1. A work instruction system comprising:

an imaging device, capturing an image including a portion of an operator and a target to be assembled;

a wearable display device, worn by the operator; and an information processing device, comprising a processor that is configured to:

identify a process to be performed to assemble the target, wherein the process comprises a plurality of element tasks;

acquire the captured image including the portion of the operator and the target from the imaging device;

detect a position of the target and a position of the portion of the operator in the captured image;

determine a distance between the position of the target and the position of the operator based on the position of the target and the position of the portion of the operator in the captured image;

determine a completion of a current element task among the plurality of element tasks when the distance between the position of the target and the position of the operator is within a predetermined distance;

identify among the plurality of element tasks an element task to be performed next in response to determining that the current element task has been completed; and control the wearable display device to display the plurality of element tasks of the process at a same time on the wearable display device and to highlight the element task to be performed next on the wearable display device, wherein the wearable display device is a glasses-style head mount device, which display the plurality of element tasks that overlaps a field of view of the operator.

2. The work instruction system according to claim 1, wherein each of the plurality of element tasks is a collection of a series of operations having a same purpose.

3. The work instruction system according to claim 1, wherein each of the plurality of element tasks is a collection of a series of operations using a same tool with respect to the target.

4. The work instruction system according to claim 1, wherein each of the plurality of element tasks is a collection of a series of operations in which a same member is attached to or removed from the target.

5. A work instruction method comprising:

capturing an image including a position of an operator and a target to be assembled by an imaging device;

identifying a process to be performed to assemble the target, wherein the process comprises a plurality of element tasks;

acquiring the captured image including the portion of the operator and the target from the imaging device;

detecting a position of the target and a position of the portion of the operator in the captured image;

determining a distance between the position of the target and the position of the operator based on the position of the target and the position of the portion of the operator in the captured image;

determining a completion of a current element task among the plurality of element tasks when the distance between the position of the target and the position of the operator is within a predetermined distance;

identifying among the plurality of element tasks an element task to be performed next in response to determining that the current element task has been completed; and control a wearable display device worn by the operator to display the plurality of element tasks of the single process at a same time and highlight the element task to be performed next, wherein the wearable display device is a glasses-style head mount device, which display the plurality of element tasks that overlaps a field of view of the operator.

6. The work instruction system according to claim 1, wherein the plurality of element tasks of the process are displayed in a list on the wearable display device, and the element task to be performed next among the plurality of the element tasks in the list, and wherein the processor is further configured to further illustrate, on the wearable display device, an operation of the element task to be performed next by highlighting an area corresponding to the operation in the field of view of the operator along with an instruction for performing the operation.

\* \* \* \* \*